US012654973B2

(12) United States Patent
Matsuo

(10) Patent No.: US 12,654,973 B2
(45) Date of Patent: Jun. 16, 2026

(54) IMAGE READING APPARATUS

(71) Applicant: CANON KABUSHIKI KAISHA,
Tokyo (JP)

(72) Inventor: Kazuki Matsuo, Kanagawa (JP)

(73) Assignee: Canon Kabushiki Kaisha, Tokyo (JP)

( * ) Notice: Subject to any disclaimer, the term of this
patent is extended or adjusted under 35
U.S.C. 154(b) by 5 days.

(21) Appl. No.: 18/750,184

(22) Filed: Jun. 21, 2024

(65) Prior Publication Data

US 2025/0019197 A1      Jan. 16, 2025

(30) Foreign Application Priority Data

Jun. 23, 2023     (JP) ................................. 2023-103041

(51) Int. Cl.
*B65H 31/02*          (2006.01)
*B65H 31/24*          (2006.01)
*H04N 1/00*           (2006.01)

(52) U.S. Cl.
CPC ............. *B65H 31/02* (2013.01); *B65H 31/24*
(2013.01); *H04N 1/00631* (2013.01); *B65H*
*2405/1111* (2013.01); *B65H 2405/1113*
(2013.01); *B65H 2405/1114* (2013.01); *H04N*
*1/00551* (2013.01); *H04N 1/00559* (2013.01)

(58) Field of Classification Search
CPC ........ B65H 31/02; B65H 31/22; B65H 31/24;
B65H 2405/1111; B65H 2405/1113;
B65H 2405/1114; B65H 2405/141; B65H
2405/1412; H04N 1/00551; H04N
1/00559; H04N 1/00631
See application file for complete search history.

(56) References Cited

U.S. PATENT DOCUMENTS

| | | | | |
|---|---|---|---|---|
| 10,272,704 | B2 * | 4/2019 | Tamai | ..................... B65H 29/70 |
| 2012/0242035 | A1 * | 9/2012 | Yoshida | ................. B65H 31/20 |
| | | | | 271/220 |
| 2020/0299095 | A1 * | 9/2020 | Takahashi | ................ B65H 5/36 |
| 2022/0038592 | A1 * | 2/2022 | Fuji | .................... H04N 1/00631 |

FOREIGN PATENT DOCUMENTS

| | | |
|---|---|---|
| JP | 2004-026370 A | 1/2004 |
| JP | 2012-148881 A | 8/2012 |

* cited by examiner

*Primary Examiner* — Prasad V Gokhale
(74) *Attorney, Agent, or Firm* — Venable LLP

(57) ABSTRACT

An image reading apparatus includes a conveying portion, a
reading portion, an ejecting portion which ejects the sheet,
conveyed by the conveying portion, in an ejection direction,
and a sheet loading portion having a first loading portion and
a second loading portion. The first loading portion is located
below the ejecting portion and loaded with the sheet ejected
from the ejecting portion. The second loading portion is
located on a downstream side of the first loading portion in
the ejection direction and is inclined with respect to the first
loading portion so as to slope upward gradually further
downstream in the ejection direction. In the ejection direc-
tion, a distance from the ejecting portion to an upstream end
of the second loading portion is longer than a distance from
the upstream end of the second loading portion to the
downstream end of the loading portion.

17 Claims, 12 Drawing Sheets

A-A SECTIONAL VIEW

B-B
SECTIONAL
VIEW

ENLARGED VIEW OF
C PART

200

223

222

221

220

207

218

X

Y

SUB-SCANNING
DIRECTION

MAIN-SCANNING
DIRECTION

F-F SECTIONAL VIEW 309    310a

Z

X

EJECTION
DIRECTION EJD 321   323   322        327

320

309                              310a

Z

X

EJECTION
DIRECTION EJD 321   323   322        327

320

309                              310b

Z

X

EJECTION
DIRECTION EJD 321   323   322        327

320

309                    310a   310b

Z

X

EJECTION
DIRECTION EJD 321   323   322        327

320

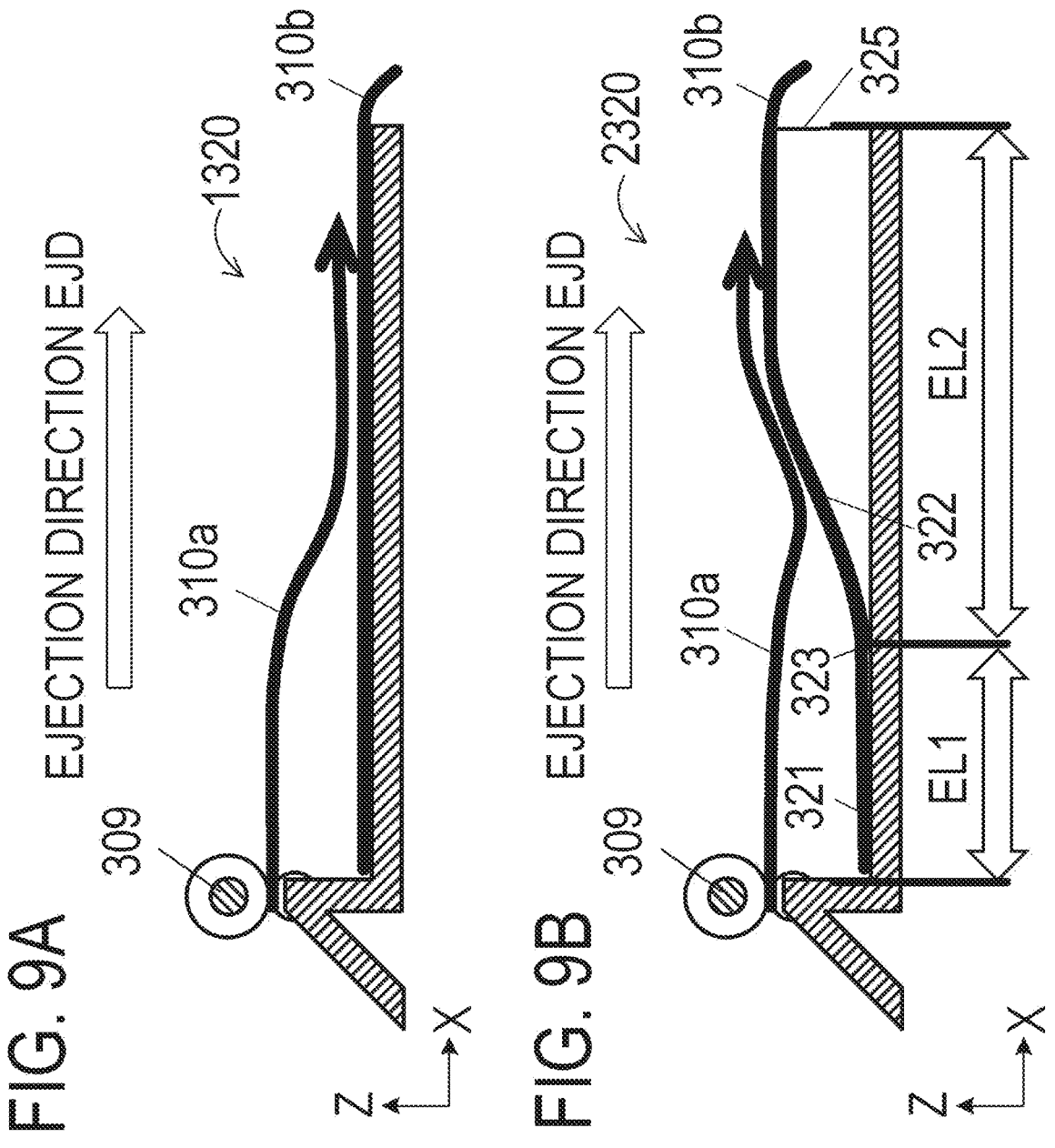

FIG. 10A   EJECTION DIRECTION EJD
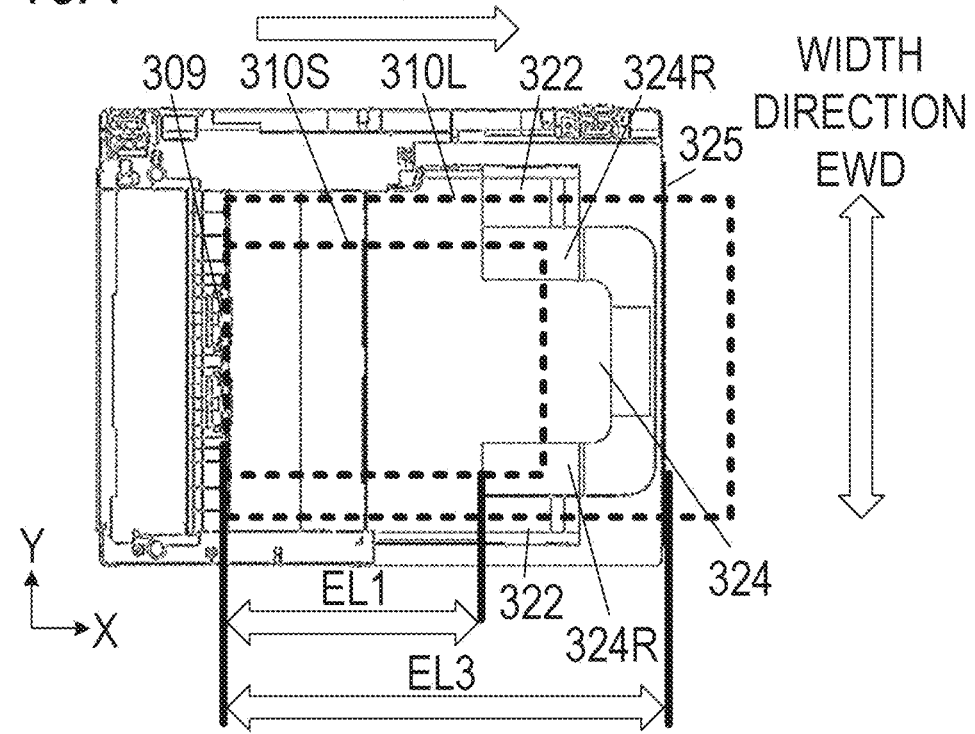
FIG. 10B
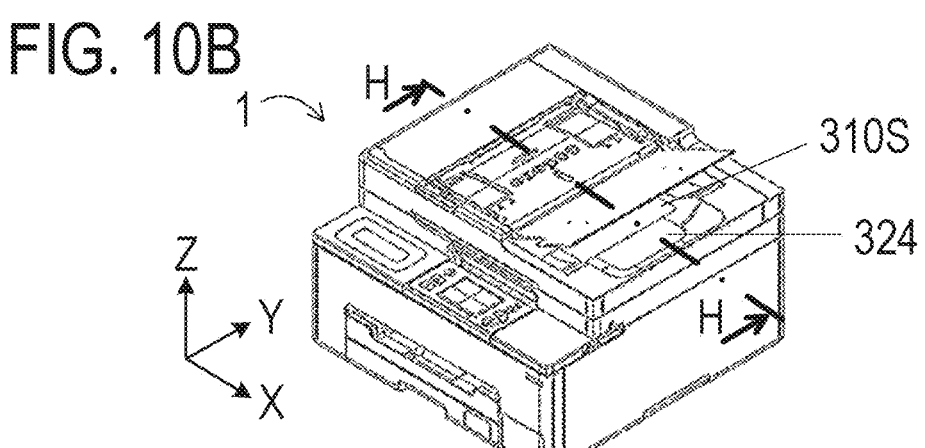
FIG. 10C   EJECTION DIRECTION EJD
H-H SECTIONAL VIEW

EJECTION
DIRECTION EJD

EJECTION
DIRECTION EJD

G-G SECTIONAL VIEW

IMAGE READING APPARATUS

BACKGROUND OF THE INVENTION

Field of the Invention

The present invention relates to an image reading apparatus including a sheet ejecting device which ejects a sheet.

Description of the Related Art

Conventionally, as a sheet ejecting device provided in an image reading apparatus or the like, a device is known that includes an ejecting portion which conveys a sheet and ejects the sheet to a device which executes printing processing, reading processing and the like and a loading portion which loads the ejected sheets. In the sheet ejecting device as above, in order to maintain performance of aligning of the sheets loaded on the loading portion, there is a need to prevent the sheets loaded after the ejection from being pushed out by the subsequent sheets ejected later.

Japanese Patent Application Publication No. 2004-26370 discloses a sheet ejecting device in which a preventing portion, which prevents movement of the sheets by abutting a distal end of the sheet, is provided in the loading portion. In the configuration as above, the sheet is prevented from protruding from the loading portion and falling.

SUMMARY OF THE INVENTION

However, when the aforementioned configuration is applied to a small-sized sheet ejecting device, a sheet with a size larger than an ejected-sheet loading portion cannot be loaded on the ejected-sheet loading portion, and sheets to be handled are greatly limited. On the other hand, in a configuration in which the preventing portion is not provided, it is difficult to maintain performance of aligning the sheets to be loaded.

The present invention has been made in view of the aforementioned problem and has an object to improve the alignment performance of the sheets.

In order to achieve the aforementioned objects, the image reading apparatus of the present invention includes the following:

a conveying portion that conveys a sheet;

a reading portion that reads an image on the sheet conveyed by the conveying portion;

an ejecting portion that ejects the sheet, conveyed by the conveying portion, in an ejection direction; and a sheet loading portion having a first loading portion and a second loading portion, the first loading portion being located below the ejecting portion and being loaded with the sheet ejected from the ejecting portion, and the second loading portion being located on a downstream side of the first loading portion in the ejection direction and inclined with respect to the first loading portion such that the second loading portion slopes upward gradually further toward downstream in the ejection direction, wherein in the ejection direction, a distance from the ejecting portion to an upstream end of the second loading portion is larger than a distance from the upstream end of the second loading portion to a downstream end of the sheet loading portion.

According to the present invention, performance of aligning the sheets can be improved.

Further features of the present invention will become apparent from the following description of exemplary embodiments with reference to the attached drawings.

BRIEF DESCRIPTION OF THE DRAWINGS

FIGS. 6A and 6B are perspective views of an ejected-sheet loading portion according to the first embodiment;

FIGS. 9A and 9B are cross-sectional views of an ejected-sheet loading portion according to a comparative example;

FIGS. 10A to 10C are explanatory diagrams of the ejected-sheet loading portion according to the first embodiment;

DESCRIPTION OF THE EMBODIMENTS

Figures 1A, 1B:
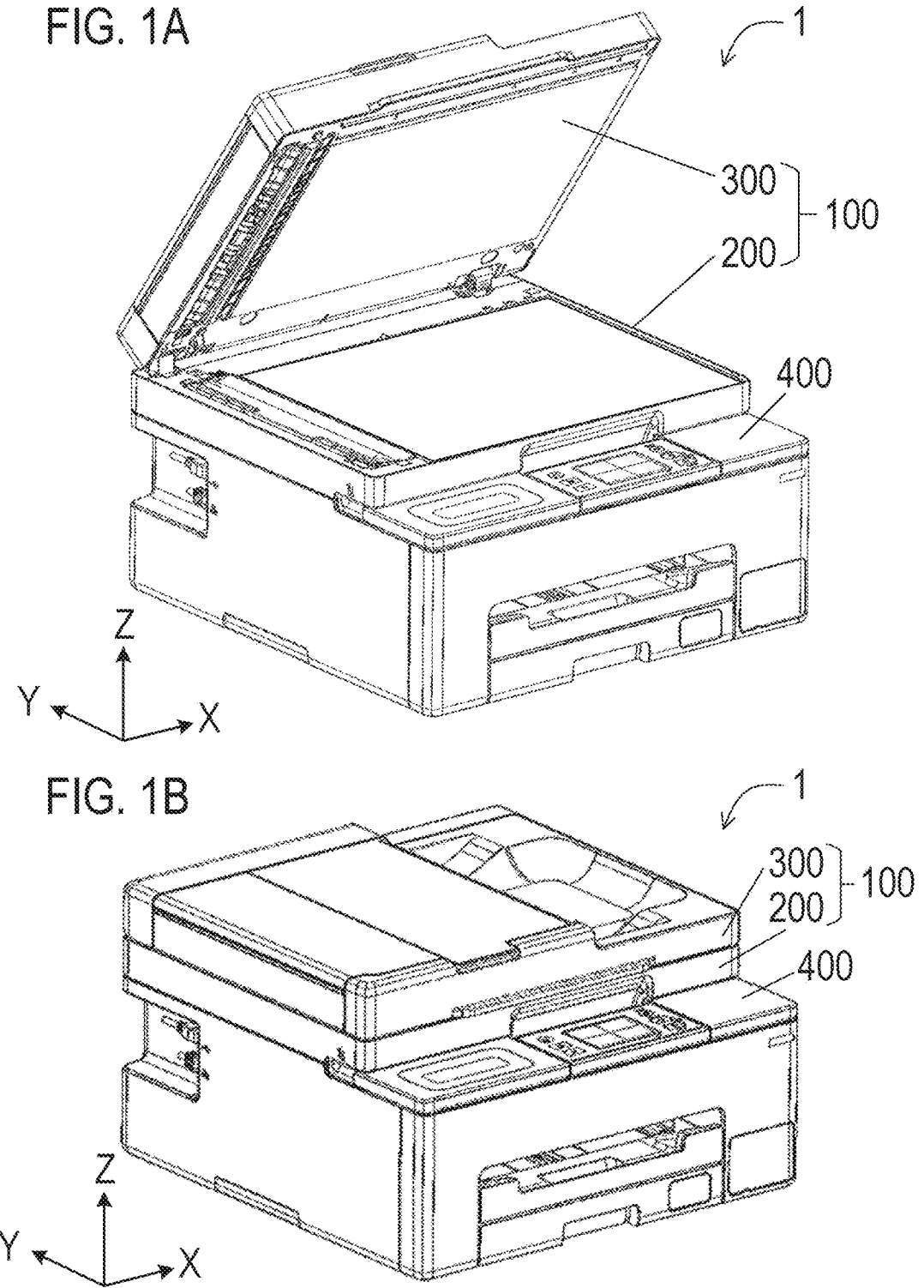
FIGS. 1A and 1B are perspective views of an image reading apparatus according to a first embodiment.

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments.

A sheet ejecting device of the present invention can be applied to a flat-bed scanner apparatus, a copying machine which combines the flat-bed scanner device, a printing device and the like, a facsimile machine, and a multifunction machine and the like. The present invention is particularly suitable for a sheet ejecting device provided in an image reading apparatus provided in the aforementioned multifunction machine and the like. Hereinafter, as an example of the image reading apparatus to which the present invention is applied, an image reading apparatus which takes in a sheet image for processing by a computer or the like will be explained. Note that the same signs indicate the same or corresponding parts throughout the drawings. An X-direction indicated as appropriate in the drawing is a width direction of the image reading apparatus, a Y-direction is a depth direction, and a Z-direction [for] is a height direction.

In embodiments which will be explained below, the X-direction, the Y-direction, and the Z-direction are orthogonal to one another.

First Embodiment

Image Reading Apparatus 100

FIGS. 1A and 1B are appearance perspective views of a multifunction machine 1 which combines an image reading apparatus 100 according to a first embodiment of the present invention and a printing device 400, which is an inkjet printer. The image reading apparatus 100 is roughly constituted by a scanner portion 200 as a reading portion which reads an image on a sheet and an ADF portion 300 configured to be capable of conveying the sheet. The ADF portion 300 is configured to be capable of being opened/closed with respect to the scanner portion 200 in order to make the sheet loadable on the scanner portion 200. FIG. 1A illustrates the image reading apparatus 100 in a state where the ADF portion 300 is open. FIG. 1B illustrates the image reading apparatus 100 in a state where the ADF portion 300 is closed.

Figure 2:
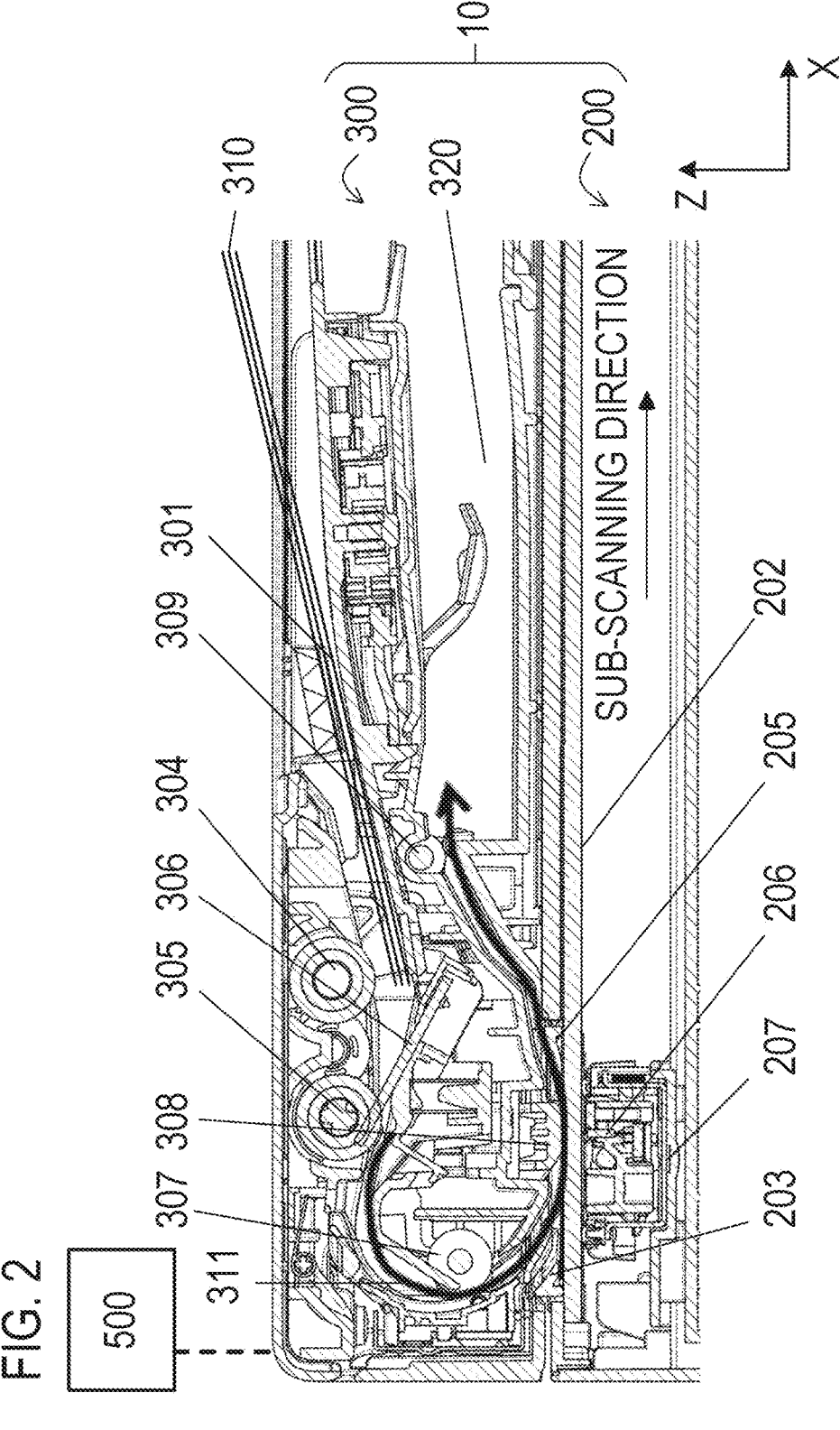
FIG. 2 is a cross-sectional view of the image reading apparatus according to the first embodiment.

Subsequently, with reference to FIG. 2, the configuration of the image reading apparatus 100 will be explained. FIG. 2 is a cross-sectional view of the scanner portion 200 and the ADF portion 300 of the image reading apparatus 100. FIG. 2 illustrates a cross section on an X-Z plane of the image reading apparatus 100 in a state where the ADF portion 300 is closed. In FIG. 2, a path of the sheet passing through a sheet conveying path 311 is indicated by a solid-line arrow in the ADF portion 300. A part of the sheet conveying path 311 is constituted by a part of the scanner portion 200.

The ADF portion 300 includes a sheet placement table 301 on which the automatically conveyed sheet is loaded, a sheet-conveyance mechanism portion configured to be capable of conveying the sheet, and an ejected-sheet loading portion 320. FIG. 2 illustrates a state where a plurality of sheets 310 are placed on the sheet placement table 301. The sheet-conveyance mechanism portion is conveying means including a sheet conveyance mechanism from a pickup roller 304 to an ejection roller 309, which will be explained below. Moreover, the sheet-conveyance mechanism portion can be also described as being constituted by a conveying portion which conveys the sheet 310 and an ejecting portion which includes the ejection roller 309 and ejects the sheet 310. Furthermore, the ADF portion 300 can be understood to be a kind of sheet ejecting device which ejects the sheet 310 by the ejection roller 309.

The automatically-conveyed sheet is first placed on the sheet placement table 301 provided on an upper part of the ADF portion 300. The sheet 310 mounted on the sheet placement table 301 is conveyed by the pickup roller 304 of the sheet-conveyance mechanism portion toward a separation roller 305. After that, the sheet 310 is conveyed by the separation roller 305 and a separation pad 306 one by one to a conveyance roller 307 on a downstream side in a conveyance direction. Subsequently, the sheet 310 is conveyed by the conveyance roller 307 to a conveyance guide 203 on the downstream side in the conveyance direction. The conveyance guide 203 is a guide portion provided detachably with respect to the image reading apparatus 100. When the sheet 310 passes through the conveyance guide 203, the sheet 310 is pressed by a white pressing plate 308 and is brought into close contact with the conveyance guide 203. At this time, the sheet 310 is read by an image sensor 206. The white pressing plate 308 has such a size that covers the whole area in a main-scanning direction (Y-direction) of the image sensor 206.

The sheet 310 having passed through the conveyance guide 203 passes through a sheet-size index member 205 located on the downstream side in the conveyance direction with respect to the conveyance guide 203 and is ejected to the ejected-sheet loading portion 320 by the ejection roller 309 located on the downstream side in the conveyance direction of the sheet-size index member 205. The conveyance guide 203 and the sheet-size index member 205 are constituent members of the scanner portion 200. In the sheet-conveyance mechanism portion, various sheet detection sensors, not shown, are disposed, and the sheet-conveyance mechanism portion is configured to be capable of detecting the passage of a distal end and a rear end of the sheet. Detection results (outputs) of the various sheet detection sensors are used for timing control of reading of the image sensor 206 by a control portion 500. Note that, regarding the control portion 500, one may be provided in common in the image reading apparatus 100 and the printing device 400 or may be individually provided in each of the image reading apparatus 100 and the printing device 400.

There are two sheet reading methods of the image reading apparatus 100, that is, a sheet-fixed reading method (flat-bed reading) and a sheet-conveying reading method (ADF reading). The sheet-fixed reading method is such a method that the sheet is fixed on a glass table 202 of the scanner portion 200, and a reading unit 207 is moved in a sub-scanning direction (X-direction) so that the sheet is read. The sheet-conveying reading method is such a method that the reading unit 207 is fixed to a predetermined position (ADF position) under the detachable conveyance guide 203, and the sheet is read while being conveyed by the ADF portion 300.

The reading unit 207 of the scanner portion 200 in FIG. 2 is in a state of standby at the ADF position in order to read the sheet 310 which is automatically conveyed by the ADF portion 300.

Scanner Portion 200

Figures 3A, 3B, 3C, 3D:
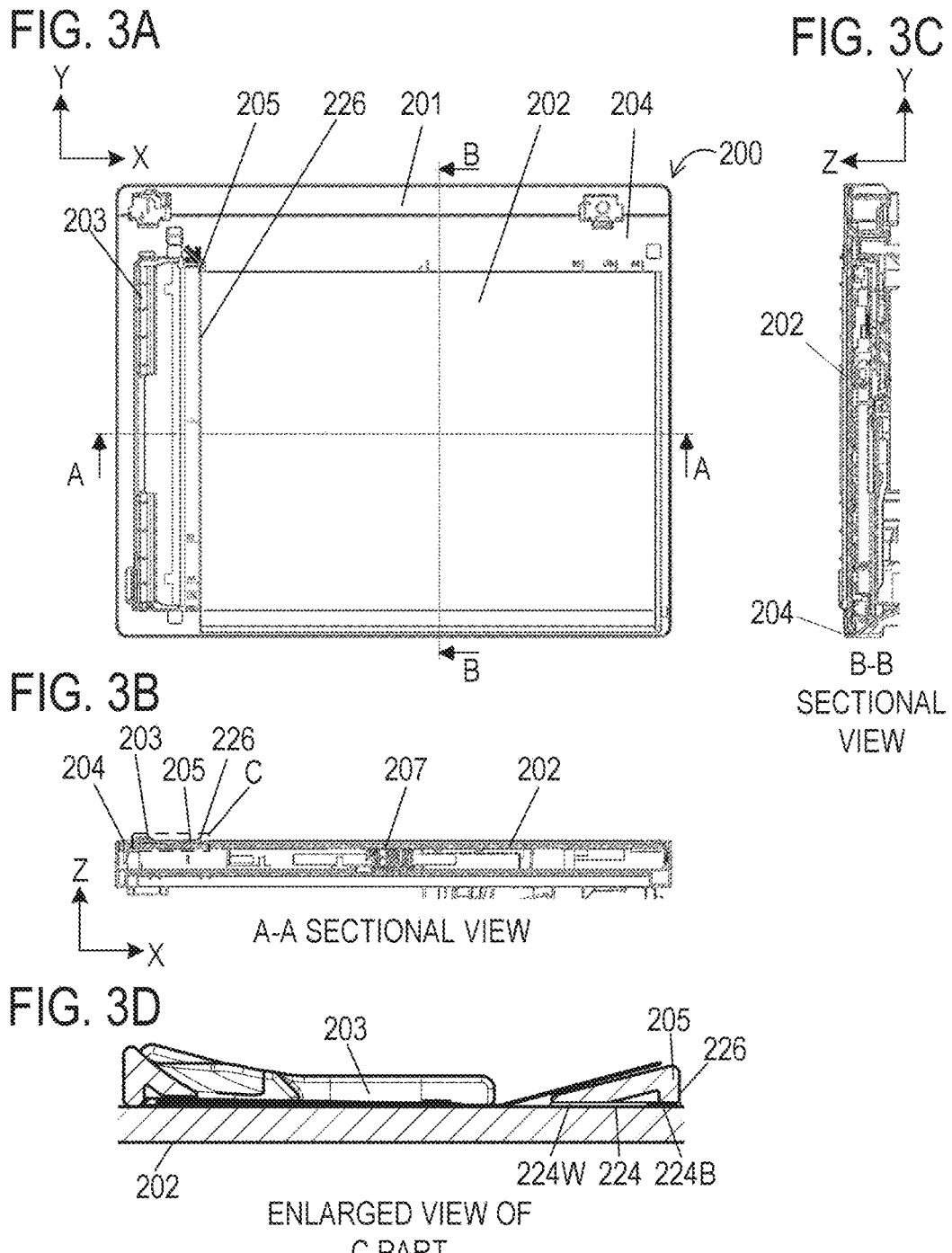
FIGS. 3A to 3D are explanatory diagrams of a scanner portion according to the first embodiment.

Subsequently, with reference to FIGS. 3A to 3D, FIG. 4, and FIG. 5, the configuration of the scanner portion 200 of the image reading apparatus 100 will be explained in more detail. FIG. 3A is a top view of the scanner portion 200 in a state where the ADF portion 300 is removed from the image reading apparatus 100 and illustrates the whole glass-frame unit 201. FIG. 3B is an A-A sectional view of FIG. 3A and a view of the scanner portion 200 when viewed from the main-scanning direction (Y-direction). FIG. 3C is a B-B sectional view of FIG. 3A and is a view of the scanner portion 200 when viewed from the sub-scanning direction (X-direction). FIG. 3D is an enlarged view of a C part of FIG. 3B and illustrates a configuration of a periphery of the sheet-size index member 205 of the glass-frame unit 201.

The glass-frame unit 201 is constituted by the glass table 202 on which the sheet 310 is placed, a conveyance guide 203 which guides the automatically conveyed sheet 310, and a glass frame 204 which holds the conveyance guide 203. The conveyance guide 203 is detachably held by the glass frame 204. The glass frame 204 includes the sheet-size index member 205 and a sheet-abutting reference 226 between the glass table 202 and the conveyance guide 203.

On a sheet placement surface side of the glass table 202, a white sheet 224 is disposed. FIG. 3D illustrates a white region 224W and a black region 224B of the white sheet 224 in a simplified manner. Details of the white region 224W and the black region 224B of the white sheet 224 are shown in FIG. 4.

Figure 4:
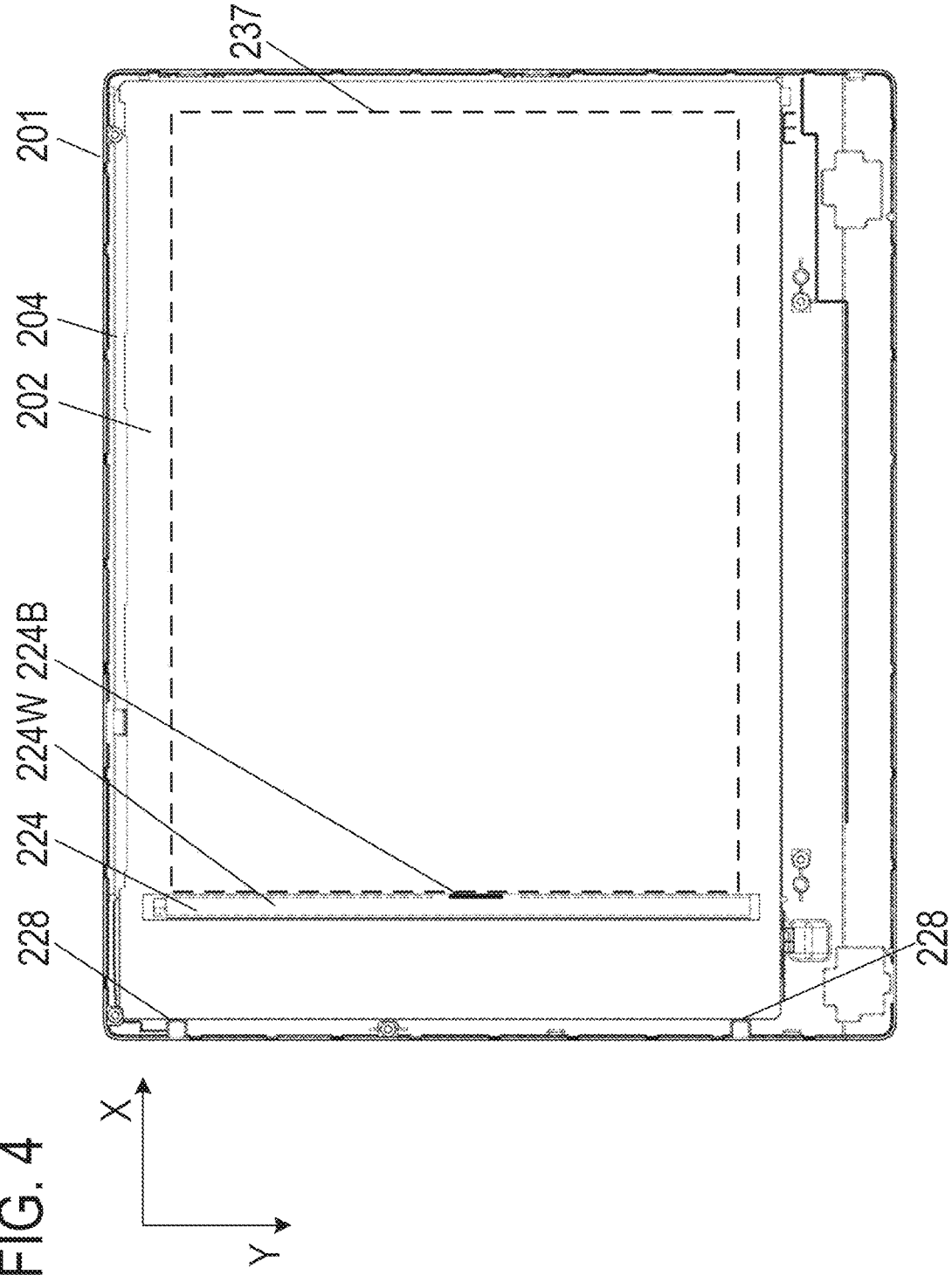
FIG. 4 is a rear view of a glass-frame unit according to the first embodiment.

FIG. 4 is a rear view of the glass-frame unit 201 in FIG. 3A and is a view of the glass-frame unit 201 when viewed from the printing device 400 side. In FIG. 4, a part of the white sheet 224 is illustrated. A position in the X-direction of the glass table 202 is determined by being abutted against glass-frame abutting portions 228 at two spots in the glass frame 204. The white sheet 224 is disposed on the rear surface side of the glass table 202 and on the sheet placement surface in the viewing direction of the drawings. As shown in FIG. 4, the position in the X-direction of the white sheet 224 is between the glass-frame abutting portions 228 and a still-sheet reading area 237.

The white sheet 224 integrally includes a white region 224W for performing shading correction of the image sensor 206 in the reading unit 207 and a black region 224B to be a reference position in the sub-scanning direction (X-direction) of the image sensor 206. In order to execute the shading processing, the white sheet 224 has such a size that covers the whole area in the main-scanning direction (Y-direction) of the image sensor 206. The position in the sub-scanning direction of the black region 224B in the white sheet 224 is on a side closer to the still-sheet reading area 237 than the white region 224W.

Figure 5:
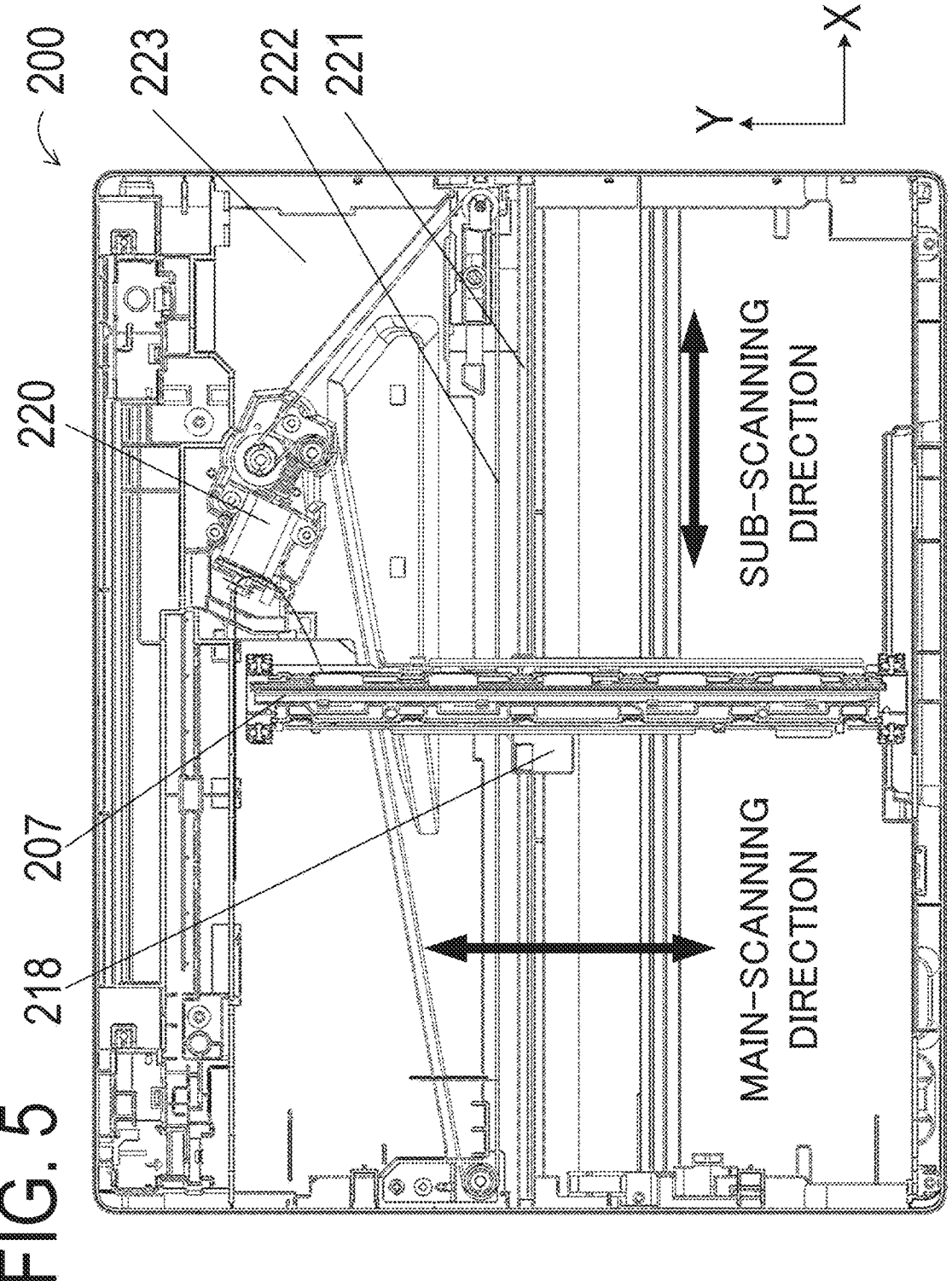
FIG. 5 is a top view illustrating an internal configuration of the image reading apparatus according to the first embodiment.

FIG. 5 is a top view of the scanner portion 200 in a state where the glass-frame unit 201 is removed. The scanner portion 200 includes a motor 220, a guide rail 221, a belt 222, and a base frame 223. FIG. 5 illustrates an internal configuration of the entire scanner portion 200 and shows a disposition relation of the reading unit 207 and the base frame 223.

On a center part in the main-scanning direction (Y-direction) of the base frame 223, the guide rail 221 with the sub-scanning direction (X-direction) as a longitudinal direction is disposed. Moreover, a slider 218 of the reading unit 207 is disposed on the guide rail 221 slidably in the sub-scanning direction (X-direction). The reading unit 207 is connected through the belt 222 and a drive transmitting portion. When an input of drive is inputted to the motor 220, the belt 222 is moved in accordance with the input, and the reading unit 207 performs reciprocating scanning along the guide rail 221. By means of the configuration as above, the reading unit 207 is configured movably in the sub-scanning direction.

Note that, the first embodiment is a belt-drive type in which the drive portion is disposed on the base frame 223, and a drive force thereof is transmitted by the belt 222, but it may be a self-traveling type reading unit in which the drive portion is disposed on the reading unit 207.

Ejected-Sheet Loading Portion 320

Subsequently, with reference to FIGS. 6A and 6B, FIGS. 7A and 7B, FIGS. 8A to 8D, FIGS. 10A to 10C, and FIG. 11, a configuration of the ejected-sheet loading portion 320 of the ADF portion 300 will be explained.

Figures 6A, 6B:
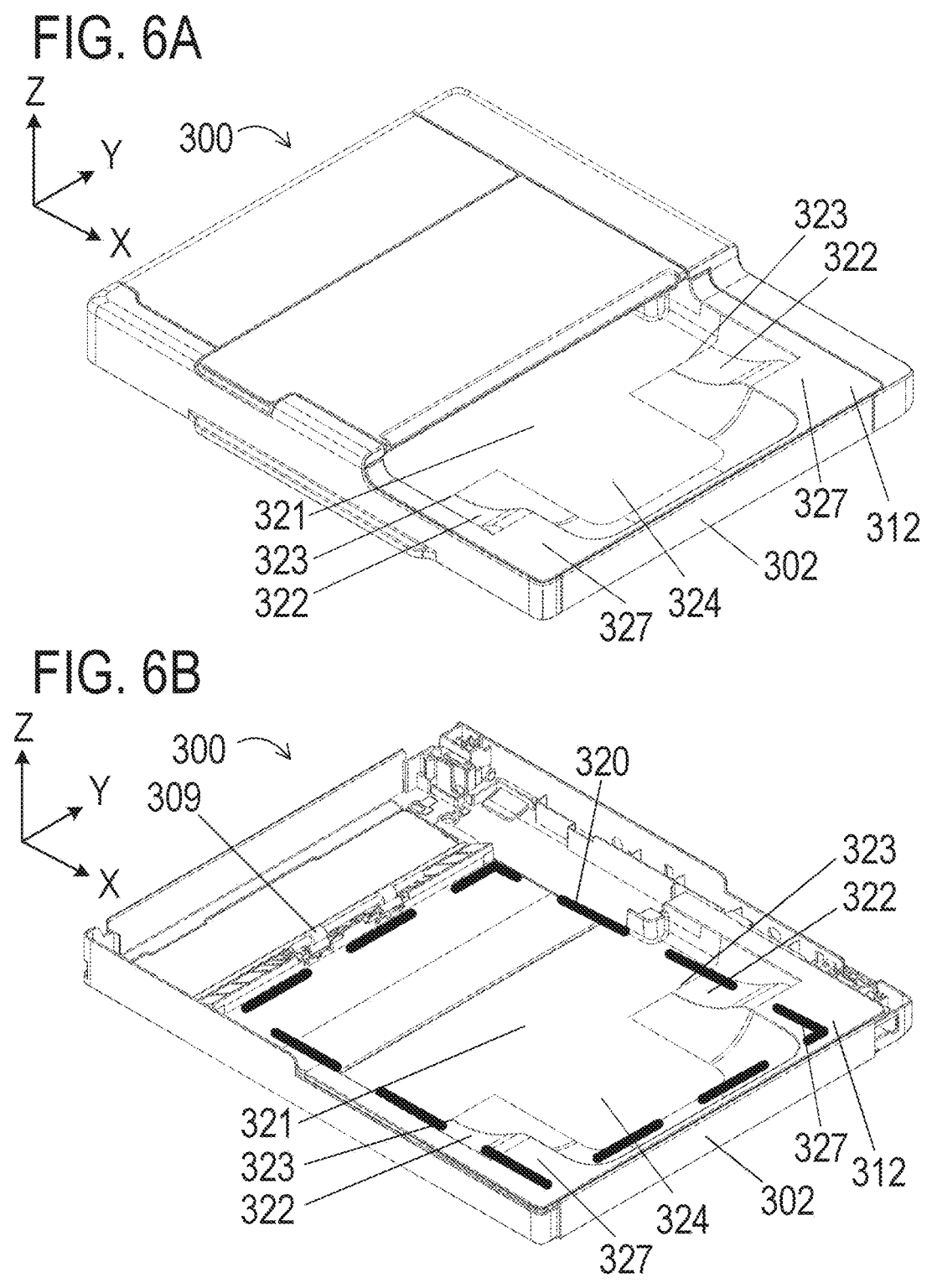

FIG. 6A is a perspective view illustrating an appearance of the ADF portion 300. FIG. 6B is a perspective view illustrating the ejected-sheet loading portion 320 in the ADF portion 300. The ejected-sheet loading portion 320 indicated by a broken line in FIG. 6B is constituted by an ADF base 302, which is a base member, and an ejected-sheet loading tray 312 as a tray member mounted on the ADF base 302. The ejected-sheet loading portion 320 has a first loading portion 321, a second loading portion 322 inclined with respect to the first loading portion 321, a dent portion 324 dented downward with respect to the second loading portion 322, and a planar portion 327 extending substantially horizontally. Moreover, in the following explanation, a part switching from the first loading portion 321 to the second loading portion 322 will be explained as an inflection portion 323.

The sheet having been conveyed by the conveying portion in the ADF portion 300 is ejected in the X-direction by the ejection roller 309 constituting the ejecting portion. In the following explanation, the ejection direction of the sheet shall be called an ejection direction EJD, and a width direction of the ejected sheet, which is a direction parallel to the Y-direction, shall be called a width direction EWD. Moreover, in the first embodiment, the control portion 500 of the image reading apparatus 100 controls a rotation speed and the like of the ejection roller 309 so that the sheet is brought into contact with the first loading portion 321 before it reaches the second loading portion 322. For example, it may be so configured that the ejection roller 309 is rotated at a rotation speed set in advance by the control portion 500, and the sheet is ejected at a predetermined ejection speed in accordance with a sheet type selected by the user.

Figure 7A:
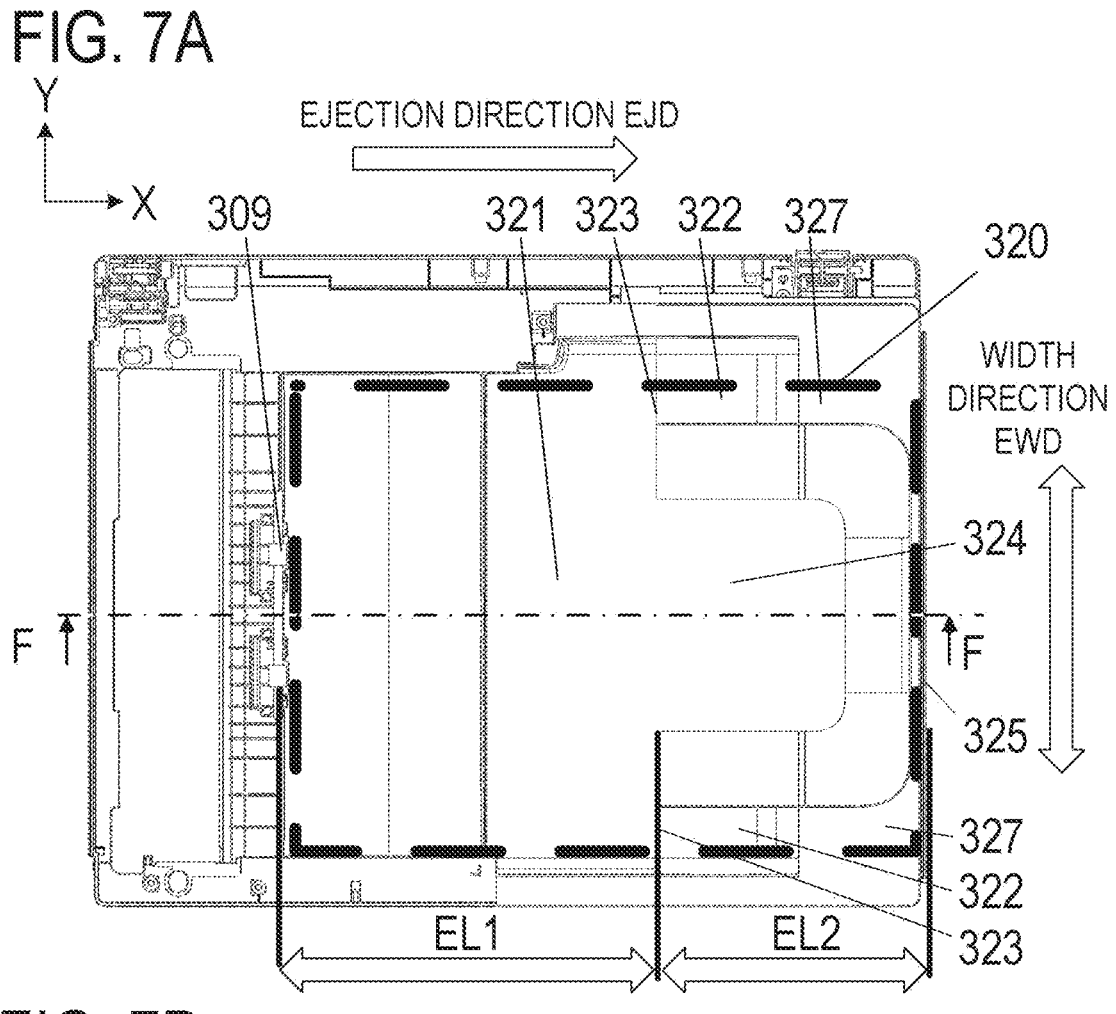
FIGS. 7A and 7B are explanatory diagrams of the ejected-sheet loading portion according to the first embodiment.
Figure 7B:
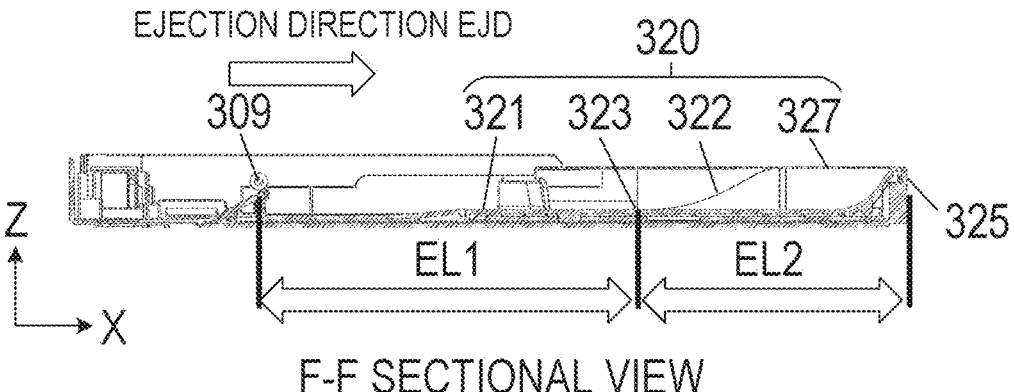

FIG. 7A is a top view of the ejected-sheet loading portion 320 and is a view of the ejected-sheet loading portion 320 when viewed in the Z-direction. FIG. 7B is an F-F sectional view of FIG. 7A and shows a section of the X-Z plane of the ejected-sheet loading portion 320. As described above, the ejected-sheet loading portion 320 has the first loading portion 321, the second loading portion 322, the inflection portion 323, the dent portion 324, and the planar portion 327. In the ejection direction EJD, from the upstream side to the downstream side, the ejection roller 309, the first loading portion 321, the inflection portion 323, the second loading portion 322 (dent portion 324), the planar portion 327, and a downstream end 325 of the ADF portion 300 are disposed in this order. The downstream end 325 is a surface facing the downstream side of the ejection direction EJD of a housing of the image reading apparatus 100.

The first loading portion 321 is located on a lower part of the ejection roller 309 and extends substantially in parallel to the ejection direction EJD. Moreover, in the width direction EWD, the first loading portion 321 extends to the whole area of the ejected-sheet loading portion 320.

The second loading portion 322 is located on the downstream side of the first loading portion 321 in the ejection direction EJD and is formed continuously with the first loading portion 321. The second loading portion 322 is inclined to the first loading portion 321 so as to go upward as it goes downstream in the ejection direction EJD. Moreover, the second loading portion 322 is formed by being divided in the width direction EWD and is located on both end parts in the width direction EWD of the ejected-sheet loading portion 320.

The dent portion 324 is located between the second loading portion 322 on one end-part side and the second loading portion 322 on the other end-part side of the ejected-sheet loading portion 320 in the width direction EWD. The dent portion 324 is formed on the same plane as that of the first loading portion 321 and is dented downward in the gravity direction with respect to the second loading portion 322.

The planar portion 327 is located on the downstream side of the second loading portion 322 in the ejection direction EJD and is formed continuously with the second loading portion 322. The planar portion 327 extends substantially horizontally from the downstream end of the second loading portion 322 to the downstream end 325 of the ADF portion 300 in the ejection direction EJD. That is, on the downstream side of the second loading portion 322, the planar portion 327 with an inclination angle to the first loading portion 321 smaller than that of the second loading portion 322 is provided.

The inflection portion 323 is a boundary between the first loading portion 321 and the second loading portion 322 in the ejection direction EJD and is the downstream end of the first loading portion 321 and an upstream end of the second loading portion 322. That is, the inflection portion 323 is the boundary where an angle of a sheet loading surface of the ejected-sheet loading portion 320 is changed.

In the ejection direction EJD, a distance EL1 from the ejection roller 309 to the inflection portion 323 is larger than a distance EL2 from the inflection portion 323 to the downstream end 325 of the ADF portion 300. By configuring the ejected-sheet loading portion 320 as above, the alignment performance of the sheets loaded on the ejected-sheet loading portion 320 can be improved. Effects of the alignment performance of the sheets by the aforementioned configuration will be described in detail below.

FIGS. 8A to 8D are explanatory views of the ejection operation of the sheet 310 and illustrate a section of the X-Z plane of the ejected-sheet loading portion 320. In the following explanation, a sheet during conveyance (ejection) shall be referred to as a conveyed sheet 310a, and a sheet ejected and loaded on the ejected-sheet loading portion 320 as a loaded sheet 310b, and they are discriminated. In FIGS. 8A to 8D, the conveyed sheet 310a during the conveyance shall be indicated by a solid line with an arrow, and the loaded sheet 310b having been ejected and loaded by a solid line without an arrow.

Figures 8A, 8B, 8C, 8D:
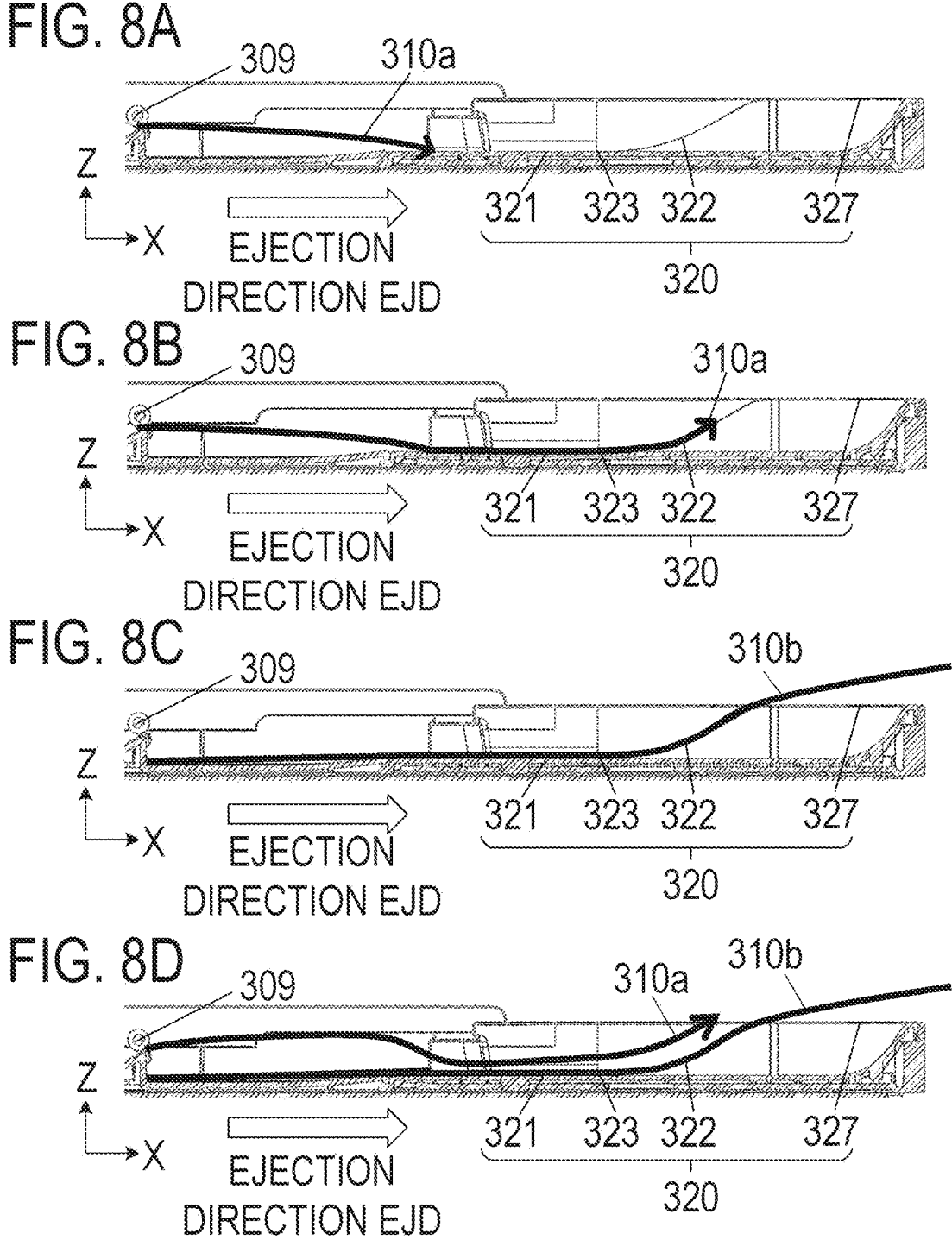
FIGS. 8A to 8D are cross-sectional views of the ejected-sheet loading portion according to the first embodiment.

FIG. 8A illustrates a state where the first conveyed sheet 310a is ejected from the ejection roller 309 and the distal end part of the conveyed sheet 310a is brought into contact with the first loading portion 321. The distal end part of the conveyed sheet 310a ejected from the ejection roller 309 is deflected by the gravity and is first brought into contact with the first loading portion 321. In the first embodiment, since the distance EL1 is sufficiently long, the conveyed sheet 310a is first brought into contact not with the second loading portion 322 but with the first loading portion 321.

FIG. 8B illustrates a state where the conveyed sheet 310a is continuously ejected from the state in FIG. 8A, the distal end part of the conveyed sheet 310a passes through the inflection portion 323 and is brought into contact with the second loading portion 322. The conveyed sheet 310a having been brought into contact with the first loading portion 321 is conveyed in the ejection direction EJD while in sliding contact with the first loading portion 321, passes through the inflection portion 323, and reaches the second loading portion 322.

FIG. 8C illustrates a state where the rear end in the ejection direction EJD of the conveyed sheet 310a is ejected from the ejection roller 309, and the ejection operation of the conveyed sheet 310a to the ejected-sheet loading portion 320 is completed. By means of this series of operations, the conveyed sheet 310a is ejected to the ejected-sheet loading portion 320 and is loaded as the loaded sheet 310b. The loaded sheet 310b follows the shape of the first loading portion 321 in the vicinity of the ejection roller 309 in the ejection direction EJD, follows the shape of the second loading portion 322 at a position away from the ejection roller 309, and is loaded on the ejected-sheet loading portion 320.

As described above, the second loading portion 322 is provided on both end parts in the width direction EWD of the ejected-sheet loading portion 320. Therefore, on the downstream side from the first loading portion 321, the loaded sheet 310b is supported by the second loading portion 322 on both end parts in the width direction EWD and is curved with the center part in the width direction EWD falling downward. Since the distal end part of the loaded sheet 310b is supported in a curved state in this way, deflection by the gravity is alleviated, and a gap in the gravity direction (Z-direction) is generated between the loaded sheet 310b and the planar portion 327. Then, a user can easily take out the loaded sheet 310b from the ejected-sheet loading portion 320.

FIG. 8D illustrates a state where the second conveyed sheet 310a is ejected onto the loaded sheet 310b ejected early by the ejection roller 309. The distal end part of the ejected conveyed sheet 310a is deflected by the gravity and is brought into contact with the loaded sheet 310b. Then, the conveyed sheet 310a is ejected in the ejection direction EJD while in sliding contact with the loaded sheet 310b loaded by following the first loading portion 321 and the second loading portion 322 and is loaded onto the loaded sheet 310b.

In order to explain the improvement effects of the sheet alignment performance by the aforementioned configuration, first, the sheet ejection operation in a comparative example will be explained. FIGS. 9A and 9B are explanatory views of the ejection operation of the sheet 310 in the comparative example.

FIG. 9A illustrates a configuration of a first comparative example in which the second loading portion 322 is not provided, and an ejected-sheet loading portion 1320 is formed on one plane. In the configuration as above, the movement of the conveyed sheet 310a and the loaded sheet 310b in the ejection direction EJD is not suppressed by the second loading portion 322. Therefore, when the conveyed sheet 310a is ejected, there is a concern that the distal end part protrudes largely from the ejected-sheet loading portion 1320 and falls from the ejected-sheet loading portion 1320. Moreover, when the conveyed sheet 310a is ejected onto the loaded sheet 310b, there is a concern that the loaded sheet 310b moves to the ejection direction EJD together with the conveyed sheet 310a and protrudes from the ejected-sheet loading portion 1320, and the alignment performance of the sheets 310 lowers.

FIG. 9B illustrates a configuration of a second comparative example in which the first loading portion 321 and the second loading portion 322 are provided in an ejected-sheet loading portion 2320. In the second comparative example, in the ejection direction EJD, the distance EL1 from the ejection roller 309 to the inflection portion 323 is equal to or smaller than the distance EL2 from the inflection portion 323 to the downstream end 325 of the ADF portion 300. Note that the distance EL1 may be a distance from the downstream end of the ejection roller 309 in the ejection direction EJD, for example.

In the configuration as in the second comparative example, the movement of the conveyed sheet 310a and the loaded sheet 310b in the ejection direction EJD is suppressed by the second loading portion 322. Therefore, the conveyed sheet 310a ejected from the ejection roller 309 does not protrude from the ejected-sheet loading portion 2320 but is loaded by following the first loading portion 321 and the second loading portion 322.

However, in the second comparative example, since the distance from the ejection roller 309 to the second loading portion 322 is short, the conveyed sheet 310a rushes up the second loading portion 322 via the loaded sheet 310b in a state with small deflection. Then, most of a conveying force of the conveyed sheet 310a by the ejection roller 309 and the like is transmitted to the loaded sheet 310b and thus, a force to move the loaded sheet 310b in the ejection direction EJD acts largely. Therefore, in the second comparative example, too, there is a concern that the loaded sheet 310b moves in the ejection direction EJD together with the conveyed sheet 310a and easily protrudes from the ejected-sheet loading portion 2320, which might lower the alignment performance of the sheets 310.

On the other hand, in the configuration of the first embodiment, since the second loading portion 322 is disposed at a position away from the ejection roller 309, the conveyed sheet 310a rushes up the second loading portion 322 via the loaded sheet 310b in a state with large deflection. Since the conveyed sheet 310a is deflected, the conveying force of the conveyed sheet 310a transmitted to the loaded sheet 310b becomes smaller. As described above, according to the configuration of the first embodiment, the movement of the loaded sheet 310b in the ejection direction EJD is suppressed by the second loading portion 322, and the conveying force of the conveyed sheet 310a transmitted to the loaded sheet 310b can be kept small. Thus, the protruding of the conveyed sheet 310a from the ejected-sheet loading portion 320 and the pushing out of the loaded sheet 310b ejected earlier from the ejected-sheet loading portion 320 by the conveyed sheet 310a to be ejected later can be both suppressed, whereby the sheet alignment performance can be improved.

Note that, in the first embodiment, the ejected-sheet loading portion 320 is configured such that the conveyed sheet 310a ejected onto the ejected-sheet loading portion 320 is first brought into contact with the first loading portion 321, and a sheet ejection speed is controlled, but in application of the present invention, such configuration is not limiting. For example, in a state where a deflected amount of the conveyed sheet 310a is sufficiently large, the distal end part of the ejected conveyed sheet 310a may jump over the first loading portion 321 and be brought into contact with an upstream-side end part of the second loading portion 322.

Subsequently, with reference to FIGS. 10A to 10C, the configuration of the ejected-sheet loading portion 320 will be explained in detail. FIG. 10A is a top view of the ejected-sheet loading portion 320 indicating a positional relation between the ejected-sheet loading portion 320 and the loaded sheet 310b in the first embodiment. FIG. 10B is a perspective view illustrating a positional relation between the multifunction machine 1 and the loaded sheet 310b in the first embodiment. FIG. 10C is an H-H sectional view of FIG. 10B and illustrates a section of the X-Z plane in the ADF portion 300.

The image reading apparatus 100 is configured to be capable of dealing with the sheet 310 of a size within a predetermined range set in advance. FIG. 10A illustrates a state where a maximum sheet 310L with a maximum size and a minimum sheet 310S with a minimum size in the applicable size sheets 310 are loaded in the ejected-sheet loading portion 320 by a dotted line.

In the ejected-sheet loading portion 320, in the ejection direction EJD, a distance EL3 from the ejection roller 309 to the downstream end 325 of the ADF portion 300 is configured smaller than the entire length of the maximum sheet 310L. Note that the distance EL3 is equal to a total value of the distance EL1 from the ejection roller 309 to the inflection portion 323 and the distance EL2 from the inflection portion 323 to the downstream end 325 of the ADF portion 300. In the ejection direction EJD, such a structure that inhibits movement of the sheet 310 is not provided from the second loading portion 322 to the downstream end 325. Therefore, when the maximum sheet 310L is ejected and loaded on the ejected-sheet loading portion 320, in the ejection direction EJD, the distal end part of the maximum sheet 310L is brought into a state of protruding of the downstream end 325 of the ADF portion 300. Even with the configuration in which the loaded sheet 310b is loaded in such a state, the fall of the loaded sheet 310b from the ejected-sheet loading portion 320 is suppressed by the second loading portion 322.

By making the length of the ejection direction EJD of the ejected-sheet loading portion 320 shorter than the entire length of the maximum sheet 310L, a part of the sheet 310 protrudes from the ADF portion 300, and the sheet 310 is loaded and thus, the user can easily take out the sheet 310 from the ADF portion 300. Moreover, since there is no need to excessively enlarge the size of the ADF portion 300 in accordance with the maximum sheet 310L, the size of the image reading apparatus 100 or the multifunction machine 1 can be reduced.

On the other hand, the distance EL3 in the ejection direction EJD of the ejected-sheet loading portion 320 is larger than the minimum sheet 310S. Moreover, in the first embodiment, the distance EL1 in the ejection direction EJD of the ejected-sheet loading portion 320 is smaller than the entire length of the minimum sheet 310S. Moreover, in the width direction EWD, a curved surface 324R curved upward as it gets closer to the second loading portion 322 is formed on the dent portion 324. In the width direction EWD, the second loading portion 322 and the dent portion 324 are disposed so that both end parts of the minimum sheet 310S are located on the curved surface 324R.

Since the ejected-sheet loading portion 320 is configured as above, when the minimum sheet 310S is loaded on the ejected-sheet loading portion 320, the distal end part of the minimum sheet 310S is contained inside the ejected-sheet loading portion 320. At this time, the distal end part of the minimum sheet 310S is supported by the curved surface 324R on both end parts in the width direction EWD. Therefore, the user can easily take out the loaded sheet 310b from the ejected-sheet loading portion 320 by putting his or her hand in the dent portion 324. As described above, according to the configuration of the first embodiment, even if the loaded sheet 310b with such a size that the distal end part does not protrude from the ejected-sheet loading portion 320 is loaded on the ejected-sheet loading portion 320, the user can take out the loaded sheet 310b with favorable operability.

Subsequently, with reference to FIG. 10C, a fed-sheet loading tray 331 mounted on the sheet placement table 301 will be explained in detail. In the ADF portion 300, the fed-sheet loading tray 331 capable of loading the sheet 310 fed to the sheet-conveyance mechanism portion is provided. The fed-sheet loading tray 331 is configured to be capable of rotational movement around a rotation axis extending in the width direction EWD with respect to the sheet placement table 301 on the upper part of the ADF portion 300. FIG. 10C illustrates a state where the fed-sheet loading tray 331 is located above the second loading portion 322 and is usable, and a rotational-movement center 331a of the fed-sheet loading tray 331 is illustrated.

In the ejection direction EJD, the rotational-movement center 331a of the fed-sheet loading tray 331 is located between the ejection roller 309 and the inflection portion 323. Moreover, an inclination angle of the fed-sheet loading tray 331 in a use state to a horizontal plane and an inclination angle of the second loading portion 322 to the horizontal plane are substantially the same, and a sheet loaded surface of the fed-sheet loading tray 331 and a sheet loaded surface of the second loading portion 322 are substantially parallel. By means of the configuration as above, a space where the user takes out the minimum sheet 310S can be ensured wide.

Moreover, the rotational-movement center 331a of the fed-sheet loading tray 331 is located above the ejection roller 309 and thus, the fed-sheet loading tray 331 is disposed so as not to prevent ejection of the sheet 310. Furthermore, in the ejection direction EJD, an end part 331b on the downstream side of the fed-sheet loading tray 331 in the use state is located between the inflection portion 323 and the downstream end 325 of the ADF portion 300. Therefore, the fed-sheet loading tray 331 is configured so as to be contained on an inner side of the image reading apparatus 100 and it does not protrude from the downstream end 325, for example. By means of the configuration as above, the fed-sheet loading tray 331 does not limit an apparatus size of the image reading apparatus 100 or the like, and the fed-sheet loading tray 331 can be used even in a small space.

As described above, according to the configuration of the first embodiment, while a size increase in the sheet ejecting device is suppressed, fall of the conveyed sheet 310a or the loaded sheet 310b from the ejected-sheet loading portion 320 is suppressed, and the alignment performance of the loaded sheets 310b can be improved. In order to efficiently improve the sheet alignment performance, the distance EL1 is preferably made larger than the distance EL2, and the distance EL1 is particularly preferably made larger by 1.2 times or more than the distance EL2.

Figure 11:
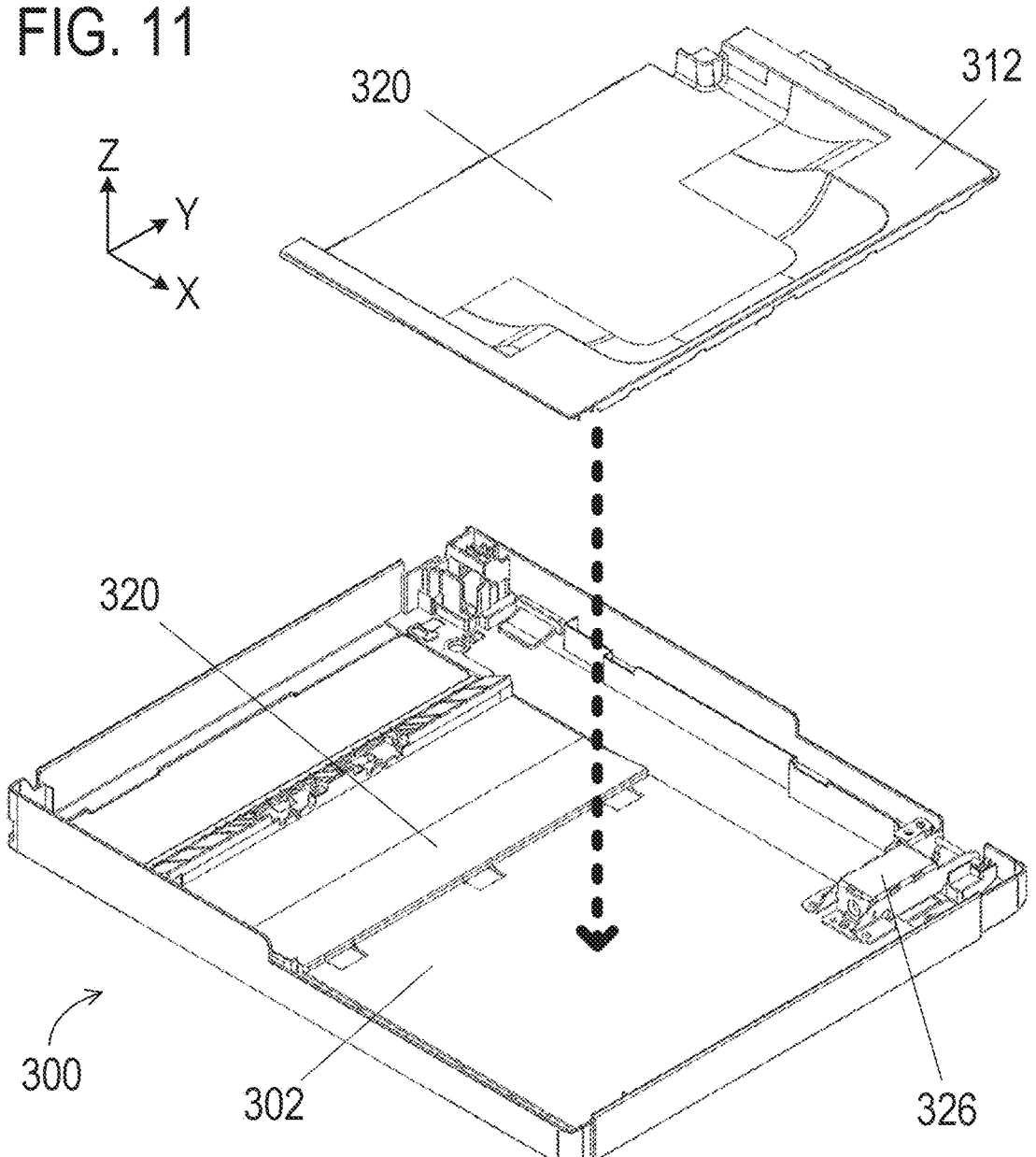
FIG. 11 is an exploded view of the ejected-sheet loading portion according to the first embodiment.

FIG. 11 is an exploded view of the ADF portion 300 in the first embodiment. The ejected-sheet loading portion 320 is configured such that the ejected-sheet loading tray 312 is mounted on the ADF base 302. On the ADF base 302, a part of the first loading portion 321 of the ejected-sheet loading portion 320 is formed, and on the ejected-sheet loading tray 312, a part of the first loading portion 321 of the ejected-sheet loading portion 320, the second loading portion 322, the planar portion 327 and the like are formed.

Moreover, on the ADF base 302, an ADF hinge 326 is provided as a hinge portion which supports the ADF portion 300, capable of opening/closing with respect to the scanner portion 200, is provided. By means of the ADF hinge 326, the ADF portion 300 is held in an open state as shown in FIG. 1A. In a state where the ejected-sheet loading tray 312 is mounted on the ADF base 302, the ADF hinge 326 is covered by the ejected-sheet loading tray 312. That is, in the first embodiment, the ejected-sheet loading tray 312 including the first loading portion 321 and the second loading portion 322 has a function as a cover member which covers the ADF hinge 326. By means of the configuration as above, the user's touch on the ADF hinge 326 is prevented, and an increase in the number of components can be suppressed.

Second Embodiment

Subsequently, with reference to FIGS. 12A and 12B, a second embodiment of the present invention will be explained. As the first embodiment, the configuration of the sheet ejecting device provided in the image reading apparatus 100 was explained, but a sheet ejecting device provided in the printing device 400 as a recording device having a conveying portion which conveys a sheet and a recording portion which records an image on the sheet can be also configured similarly. Hereinafter, in the configuration of the second embodiment, only points different from the configuration of the first embodiment will be explained. In the configuration of the second embodiment, those similar to the configuration in the first embodiment are given the same signs, and explanation will be omitted.

Figures 12A, 12B:
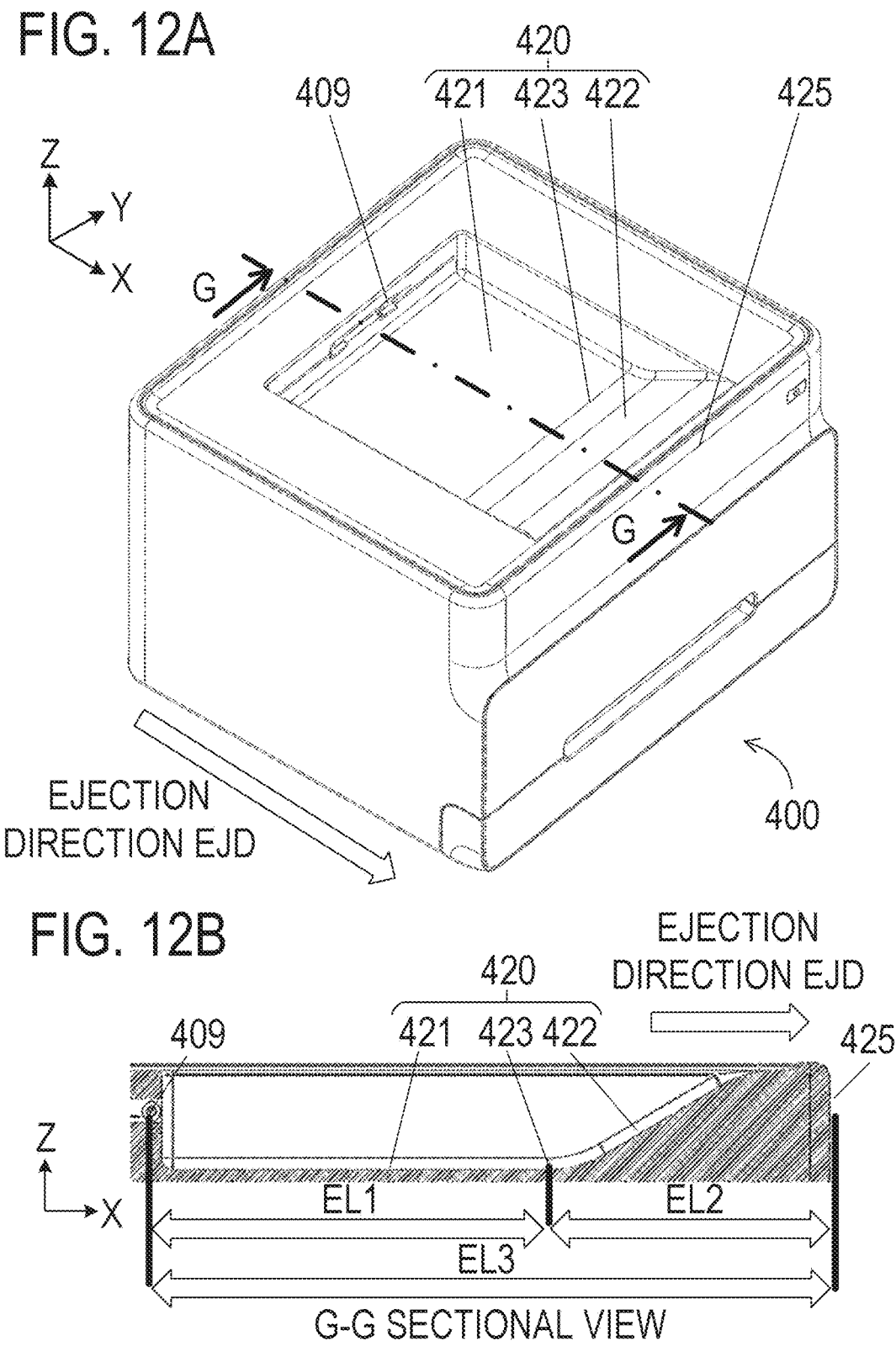
FIGS. 12A and 12B are explanatory diagrams of an ejected-sheet loading portion according to a second embodiment.

FIGS. 12A and 12B are explanatory diagrams of the ejected-sheet loading portion 320 of the printing device 400 according to the second embodiment. FIG. 12A is a perspective view of the printing device 400. FIG. 12B is a G-G sectional view of FIG. 12A and is a diagram of the sheet ejected from the printing device 400 viewed in the width direction EWD.

The printing device 400 according to the second embodiment includes an ejection roller 409 constituting an ejecting portion which ejects a sheet on which a recording operation was performed and an ejected-sheet loading portion 420 from/to which the sheet is ejected/loaded. The ejected-sheet loading portion 420 has a first loading portion 421, a second loading portion 422 inclined with respect to the first loading portion 421 and located on the downstream side of the first loading portion 421, and an inflection portion 423, which is a boundary between the first loading portion 421 and the second loading portion 422.

In the ejection direction EJD, the distance EL1 from the ejection roller 409 to the inflection portion 423 is larger than the distance EL2 from the inflection portion 423 to a downstream end 425 of the printing device 400. The downstream end 425 of the printing device 400 is a surface facing the downstream side in the ejection direction EJD of a housing of the printing device 400. Moreover, the distance EL3 from the ejection roller 409 to the downstream end 425, which is a sum of the distance EL1 and the distance EL2, is smaller than the maximum sheet 310L.

By means of the aforementioned configuration, the protruding of the conveyed sheet 310a from the ejected-sheet loading portion 420 and the pushing out of the loaded sheet 310b ejected earlier from the ejected-sheet loading portion 420 by the conveyed sheet 310a to be ejected later can be both suppressed. Therefore, while the size increase in the printing device 400 is suppressed, the sheet alignment performance can be improved.

Note that the application of the present invention is not limited to the configurations of the aforementioned embodiments but can be applied to the other configurations within a range not losing the identity of the invention. For example, the sheet ejecting device is not limited to those provided in the image reading apparatus 100 and the printing device 400 but may be provided in the other devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-103041, filed on Jun. 23, 2023, which is hereby incorporated by reference herein in its entirety.

What is claimed is:

1. An image reading apparatus comprising:
   a conveying portion that conveys a sheet;
   a reading portion that reads an image on the sheet conveyed by the conveying portion;
   an ejecting portion that ejects the sheet, conveyed by the conveying portion, in an ejection direction; and
   a sheet loading portion having a first loading portion and a second loading portion, the first loading portion being located below the ejecting portion and being loaded with the sheet ejected from the ejecting portion, and the second loading portion being located on a downstream side of the first loading portion in the ejection direction and inclined with respect to the first loading portion such that the second loading portion slopes upward gradually further downstream in the ejection direction, wherein in the ejection direction, a distance from the ejecting portion to an upstream end of the second loading portion is longer than a distance from the upstream end of the second loading portion to a downstream end of the sheet loading portion and a distance from the ejecting portion to the downstream end of the sheet loading portion is shorter than an entire length of a sheet with a maximum size that can be handled by the image reading apparatus set in advance.

2. The image reading apparatus according to claim 1, wherein the second loading portion is provided on both end parts in a width direction orthogonal to the ejection direction of the sheet loading portion, and the sheet loading portion has a dent portion dented downward in a gravity direction with respect to the second loading portion, the dent portion being located between the second loading portion on one end part side of the sheet loading portion and the second loading portion on another end part side in the width direction.

3. The image reading apparatus according to claim 2, wherein the sheet loading portion has a planar portion located on a downstream side of the second loading portion in the ejection direction, the planar portion having an inclination angle with respect to the first loading portion less than an inclination angle of the second loading portion with respect to the first loading portion.

4. The image reading apparatus according to claim 2, wherein in the dent portion, a curved surface that is curved upward gradually in the width direction as the curved surface is nearer to the second loading portion is formed, and both end parts of a sheet are loaded on the curved surface, in a case where a sheet with a minimum size that can be handled by the image reading apparatus set in advance is loaded on the ejecting portion.

5. The image reading apparatus according to claim 1, wherein the second loading portion is formed continuously with the first loading portion in the ejection direction.

6. The image reading apparatus according to claim 1, further comprising:

a control portion that controls the ejecting portion such that a sheet is ejected at such a speed that the sheet is brought into contact with the first loading portion before a distal end part in the ejection direction of the sheet reaches the second loading portion.

7. The image reading apparatus according to claim 1, further comprising:

a loading tray on which a sheet to be fed to the conveying portion is loaded and located above the second loading portion, wherein a placement surface of the loading tray, where the sheet is placed, is inclined with respect to a horizontal plane, and an inclination angle of the loading tray is substantially the same as an inclination angle of the second loading portion.

8. The image reading apparatus according to claim 7, wherein the loading tray is configured to be capable of rotational movement around a rotational-movement axis extending in a width direction of a sheet loaded on the placement surface, and a rotational-movement center of the loading tray is located above the ejecting portion.

9. The image reading apparatus according to claim 7, wherein in the ejection direction, a downstream end of the loading tray is located further toward an upstream side than the downstream end of the sheet loading portion.

10. The image reading apparatus according to claim 1, wherein the sheet loading portion is constituted of a base member on which a part of the first loading portion is formed and a tray member on which a part of the first loading portion and the second loading portion are formed and which is mounted on the base member.

11. An apparatus comprising:

an image reading apparatus according to claim 1; and a recording portion that records an image read by the reading portion on a sheet.

12. An image reading apparatus comprising:

a conveying portion that conveys a sheet;

a reading portion that reads an image on the sheet conveyed by the conveying portion;

an ejecting portion that ejects the sheet, conveyed by the conveying portion, in an ejection direction; and a sheet loading portion having a first loading portion and a second loading portion, the first loading portion being located below the ejecting portion and being loaded with the sheet ejected from the ejecting portion, and the second loading portion being located on a downstream side of the first loading portion in the ejection direction and inclined with respect to the first loading portion such that the second loading portion slopes upward gradually further downstream in the ejection direction, wherein in the ejection direction, a distance from the ejecting portion to an upstream end of the second loading portion is longer than a distance from the upstream end of the second loading portion to a downstream end of the sheet loading portion, and a distance from the ejecting portion to an upstream end of the second loading portion is shorter than an entire length of a sheet with a minimum size that can be handled by the image reading apparatus set in advance.

13. The image reading apparatus according to claim 12, wherein the second loading portion is provided on both end parts in a width direction orthogonal to the ejection direction of the sheet loading portion, and wherein the sheet loading portion has a dent portion dented downward in a gravity direction with respect to the second loading portion, the dent portion being located between the second loading portion on one end part side of the sheet loading portion and the second loading portion on another end part side in the width direction.

14. The image reading apparatus according to claim 12, further comprising:

a loading tray on which a sheet to be fed to the conveying portion is loaded and located above the second loading portion, wherein a placement surface of the loading tray, where the sheet is placed, is inclined with respect to a horizontal plane, and an inclination angle of the loading tray is substantially the same as an inclination angle of the second loading portion.

15. An image reading apparatus comprising:

a conveying portion that conveys a sheet;

a reading portion that reads an image on the sheet conveyed by the conveying portion;

an ejecting portion that ejects the sheet, conveyed by the conveying portion, in an ejection direction; and a sheet loading portion having a first loading portion and a second loading portion, the first loading portion being located below the ejecting portion and being loaded with the sheet ejected from the ejecting portion, and the second loading portion being located on a downstream side of the first loading portion in the ejection direction and inclined with respect to the first loading portion such that the second loading portion slopes upward gradually further downstream in the ejection direction;

a hinge portion that supports the sheet loading portion so that the sheet loading portion can be opened/closed with respect to the reading portion; and a cover member that covers the hinge portion, the cover member including the first loading portion and the second loading portion, wherein in the ejection direction, a distance from the ejecting portion to an upstream end of the second loading portion is longer than a distance from the upstream end of the second loading portion to a downstream end of the sheet loading portion.

16. The image reading apparatus according to claim 15, wherein the second loading portion is provided on both end parts in a width direction orthogonal to the ejection direction of the sheet loading portion, and wherein the sheet loading portion has a dent portion dented downward in a gravity direction with respect to the second loading portion, the dent portion being located between the second loading portion on one end part side of the sheet loading portion and the second loading portion on another end part side in the width direction.

17. The image reading apparatus according to claim 15, further comprising:

a loading tray on which a sheet to be fed to the conveying portion is loaded and located above the second loading portion, wherein a placement surface of the loading tray, where the sheet is placed, is inclined with respect to a horizontal plane, and an inclination angle of the loading tray is substantially the same as an inclination angle of the second loading portion.

* * * * *